UNITED STATES PATENT OFFICE.

MAX CANTOR, OF BERLIN-FRIEDENAU, GERMANY, ASSIGNOR TO ACTIEN GESELLSCHAFT FÜR ANILIN FABRIKATION, OF BERLIN, GERMANY.

RED DISAZO DYE.

1,042,198.  Specification of Letters Patent.  Patented Oct. 22, 1912.

No Drawing.  Application filed February 12, 1912. Serial No. 677,099.

*To all whom it may concern:*

Be it known that I, MAX CANTOR, a citizen of the German Empire, residing at Berlin-Friedenau, Germany, my post-office address being Hähnelstrasse 15ª, Berlin-Friedenau, Germany, have invented certain new and useful Improvements in Red Disazo Dye, of which the following is a specification.

My invention relates to the manufacture of new red disazo dyes for wool of good fastness to washing, which derive from an aminodiarylethersulfonic acid of the benzene series, a monamin of the benzene series and a 2-naphtholsulfonic acid. These dyes produce on wool from an acid bath red shades. Their dried and pulverized sodium salts are reddish brown powders, soluble in water to red solutions, not changing their color by addition of sodium carbonate or a dilute acid, but becoming bluer by soda-lye or ammonia. In alcohol they are sparely soluble with reddish color. The solution in concentrated sulfuric acid is blue. On addition of ice the dye is separated. By action of strong reducing agents the dyes are split off, yielding aminodiarylethersulfonic acids of the benzene series, para-diamins of the benzene series and 1-amino-2-naphtholsulfonic acids.

The following examples show, how the new dyes may be manufactured. The parts are by weight:

Example 1: 28.7 parts of the sodium salt of 2-aminodiphenylether-4-sulfonic acid are dissolved in water and diazotized by means of 30 parts of hydrochloric acid 20° Bé. and 6.9 parts of sodium nitrite. The diazo compound is mixed with an aqueous solution of 11 parts of 3-toluidin and 11 parts of hydrochloric acid 20° Bé. By adding sodium acetate the combination is finished. Then the amino-azo compound is filtered off, washed, dissolved in water with the sufficient quantity of soda-lye and mixed with 7 parts of sodium nitrite. This solution is allowed to flow into 35 parts of cooled hydrochloric acid 20° Bé. The diazo compound is combined with 25 parts of the sodium salt of the 2-naphthol-7-sulfonic acid, dissolved in water with 27 parts of calcined sodium carbonate. The mass is warmed and the dye salted out.

Example 2: Diphenylether-2-sulfonic acid-4-azo-anilin is produced by saponifying the combination product of 4-diazodiphenylether-2-sulfonic acid with toluene-sulfanilid of the formula:

$$C_6H_5.NH.SO_2.C_6H_4.CH_3,$$

or by treating with hot caustic soda-lye the combination product of the same diazodiphenylether sulfonic acid with phenyl-amino-methane-omega-sulfonic acid of the formula:

$$C_6H_5.NH.CH_2.SO_3H,$$

the reaction being explained by the equation:

$$C_6H_5.OC_6H_3.(SO_3Na).N=N.C_6H_4.NH.CH_2.SO_3Na+NaOH=\\C_6H_5.O.C_6H_3.(SO_3Na).N=N.C_6H_4.NH_2+HCH.O+Na_2SO_3$$

36.9 parts of this product are dissolved in water with 4 parts of phenylhydroxid. The solution is mixed with 6.9 parts of sodium nitrite and is run into a cooled hydrochloric acid, containing 35 parts of acid 21° Bé. The diazo compound is combined with 25 parts of the sodium salt of 2-naphthol-6-sulfonic acid, dissolved in water with 25 parts of calcined sodium carbonate. When the combination is complete the dye is heated and salted out.

My present invention is not limited to the foregoing examples or to the details given therein. Thus, for instance, instead of the aminodiphenylether sulfonic acids their homologues and halogen-substitution derivatives may be used, whereas for anilin and 3-toluidin the 2-toluidin may be substituted.

Having now described my invention and in what manner it may be performed what I claim is,—

1. As new articles of manufacture the new disazo dyes dyeing wool red from an acid bath which derive from an aminodiarylethersulfonic acid of the benzene series, a monamin of the benzene series and a 2-naphtholsulfonic acid, their dried and pulverized sodium salts being reddish-brown powders, soluble in water to red solutions, not changing their color by addition of sodium carbonate or dilute acids, but becoming bluer by soda-lye or ammonia; being sparely soluble in alcohol with a reddish color; being dissolved in concentrated sulfuric acid to a blue solution, from which on addition of ice the dye is separated; being split off by action of strong reducing agents, yielding aminodiarylethersulfonic acids of the benzene series, para-diamins of the benzene series and 1-amino-2-naphtholsulfonic acids.

2. As a new article of manufacture the new disazo dye, dyeing wool red from an acid bath, which derives from 4-amino-diphenylether-2-sulfonic acid, anilin and 2-naphthol-6-sulfonic acid and corresponds to the formula:

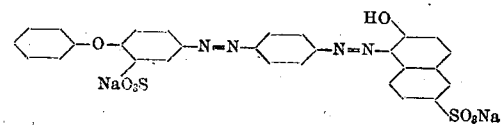

its dried and pulverized sodium salt being a reddish brown powder, soluble in water to a red solution, not changing the color by addition of sodium carbonate or dilute acids, but becoming bluer by soda-lye or ammonia; being sparely soluble in alcohol with a reddish color; being dissolved in concentrated sulfuric acid to a blue solution, from which on addition of ice the dye is separated; being split off by action of strong reducing agents, yielding 4-aminodiphenylether-2-sulfonic acid, 1.4-phenylenediamin and 1-amino-2-naphthol-6-sulfonic acid.

In testimony whereof I have hereunto set my hand in presence of two subscribing witnesses.

MAX CANTOR.

Witnesses:
HENRY HASPER,
WOLDEMAR HAUPT.